(12) United States Patent
Jeong et al.

(10) Patent No.: US 12,370,866 B2
(45) Date of Patent: Jul. 29, 2025

(54) HEAT PUMP SYSTEM FOR VEHICLE

(71) Applicants: Hyundai Motor Company, Seoul (KR); Kia Corporation, Seoul (KR); Hanon Systems, Daejeon (KR)

(72) Inventors: Hoyoung Jeong, Hwaseong-si (KR); Hochan An, Hwaseong-si (KR); Yeonho Kim, Seoul (KR); Jeawan Kim, Hwaseong-si (KR); Man Hee Park, Suwon-si (KR); Jae Yeon Kim, Hwaseong-si (KR); Yeong Jun Kim, Incheon (KR); Hae Jun Lee, Daejeon (KR); Seong Hun Kim, Daejeon (KR); Beom Seok Joo, Daejeon (KR); Yun Jin Kim, Daejeon (KR)

(73) Assignees: Hyundai Motor Company, Seoul (KR); Kia Corporation, Seoul (KR); Hanon Systems, Daejeon (KR)

( * ) Notice: Subject to any disclaimer, the term of this patent is extended or adjusted under 35 U.S.C. 154(b) by 165 days.

(21) Appl. No.: 18/464,548

(22) Filed: Sep. 11, 2023

(65) Prior Publication Data
US 2024/0375481 A1 Nov. 14, 2024

(30) Foreign Application Priority Data
May 8, 2023 (KR) .................. 10-2023-0059298

(51) Int. Cl.
*B60H 1/00* (2006.01)

(52) U.S. Cl.
CPC .................. *B60H 1/00899* (2013.01)

(58) Field of Classification Search
CPC ................. B60H 1/00899; B60H 1/323; B60H 1/00278; B60H 2001/00307; B60H 1/143; F25B 41/20; F25B 41/31
See application file for complete search history.

(56) References Cited

U.S. PATENT DOCUMENTS

| 2021/0061067 A1* | 3/2021 | Kim | B60H 1/3213 |
| 2022/0088990 A1* | 3/2022 | Kim | B60H 1/3223 |
| 2022/0185067 A1* | 6/2022 | Kim | B60H 1/00278 |

* cited by examiner

*Primary Examiner* — Lionel Nouketcha
(74) *Attorney, Agent, or Firm* — Slater Matsil, LLP

(57) ABSTRACT

An embodiment heat pump system for a vehicle includes an air conditioner unit and a chiller. The air conditioner unit includes a compressor, first through third heat-exchangers, a first expansion valve, and an evaporator interconnected by a refrigerant line for circulating a refrigerant through the refrigerant line, and the chiller is connected to the refrigerant line through a first connection line for adjusting a temperature of a coolant by heat-exchanging the refrigerant with the coolant. The air conditioner unit further includes a second expansion valve on the first connection line upstream of the chiller, a first valve on the refrigerant line between the first and second heat-exchangers, a third expansion valve on the refrigerant line between the first valve and the second heat-exchanger, a second valve on the refrigerant line between the evaporator and the compressor, and a fourth expansion valve on a second connection line.

20 Claims, 3 Drawing Sheets

HEAT PUMP SYSTEM FOR VEHICLE

CROSS-REFERENCE TO RELATED APPLICATIONS

This application claims the benefit of Korean Patent Application No. 10-2023-0059298, filed on May 8, 2023, which application is hereby incorporated herein by reference.

TECHNICAL FIELD

The present disclosure relates to a heat pump system for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

On the other hand, an environment-friendly technology of a vehicle is a core technology of a future automobile industry, and advanced car makers have focused their energy on the development of an environmentally friendly vehicle to achieve environmental and fuel efficiency regulations.

That is, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

The electric vehicle is in the spotlight as a means of transportation in the future to solve environment problems and energy resource problems.

A heat pump system, which is an air conditioner apparatus for regulating the temperature of the vehicle interior, is applied to such an electric vehicle.

However, the refrigerant that is conventionally used in the heat pump system contains a large amount of environmentally regulated material, e.g., PFAS (Per- and Polyfluoroalkyl Substances), and therefore, there is a demand for the development of a system capable of controlling the temperature of the vehicle interior by using new refrigerants without PFAS and flammability or from natural refrigerants.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a heat pump system for a vehicle. Particular embodiments relate to a heat pump system for a vehicle capable of performing cooling or heating of the vehicle interior by using a natural refrigerant and efficiently adjusting the temperature of the battery module by using a single chiller that heat-exchanges refrigerant and coolant.

Embodiments of the present disclosure provide a heat pump system for a vehicle capable of performing cooling or heating of the vehicle interior by using a natural refrigerant and efficiently adjusting the temperature of the battery module by using a single chiller that heat-exchanges refrigerant and coolant in order to cope with environmental regulations.

In addition, embodiments of the present disclosure provide a heat pump system for a vehicle capable of maximizing cooling and heating performance by operating in a super-critical cycle that is a state in which pressure and temperature of the refrigerant are higher than threshold pressure and temperature by applying the R744 refrigerant that is a natural refrigerant using carbon dioxide.

A heat pump system for a vehicle may include an air conditioner unit, including a compressor, a first heat-exchanger, a second heat-exchanger, a third heat-exchanger, a first expansion valve, and an evaporator that are interconnected by a refrigerant line and configured to circulate a refrigerant through the refrigerant line, and a chiller connected to the refrigerant line through a first connection line and configured to adjust a temperature of the coolant by heat-exchanging the refrigerant supplied from the air conditioner unit with a coolant, where the air conditioner unit may further include a second expansion valve provided on the first connection line upstream of the chiller, a first valve provided on the refrigerant line between the first heat-exchanger and the second heat-exchanger, a third expansion valve provided on the refrigerant line between the first valve and the second heat-exchanger, a second valve provided on the refrigerant line between the evaporator and the compressor, a second connection line of which a first end may be connected to the refrigerant line between the evaporator and the second valve and a second end may be connected to the refrigerant line between the third heat-exchanger and the first expansion valve, and a fourth expansion valve provided on the second connection line.

The air conditioner unit may further include a branch line of which a first end may be connected to the refrigerant line between the first valve and the third expansion valve and a second end may be connected to the second connection line, a third valve provided on the branch line, a third connection line of which a first end may be connected to the refrigerant line between the second heat-exchanger and the third heat-exchanger and a second end may be connected to the refrigerant line between the second valve and the compressor, a fourth valve provided on the third connection line, a fourth connection line of which a first end may be connected to the refrigerant line between the first heat-exchanger and the first valve and a second end may be connected to the refrigerant line between the first expansion valve and the evaporator, and a fifth expansion valve provided on the fourth connection line.

In the case of a cooling mode of the vehicle interior, the refrigerant line connecting the evaporator and the compressor may be opened by an operation of the second valve, the refrigerant line connecting the first heat-exchanger and the second heat-exchanger may be opened by an operation of the first valve and the third expansion valve, the second connection line may be closed by an operation of the fourth expansion valve, the third connection line may be closed by an operation of the fourth valve, the branch line may be closed by an operation of the third valve, and the fourth connection line may be closed by an operation of the fifth expansion valve.

The third expansion valve may be configured to supply the refrigerant supplied from the first heat-exchanger to the second heat-exchanger in an unexpanded state.

When cooling of a battery module is required in the cooling mode of the vehicle interior, the first connection line may be opened by an operation of the second expansion valve.

The second expansion valve may be configured to expand the refrigerant introduced through the first connection line and flow the expanded refrigerant to the chiller to cool the battery module by using the coolant having heat-exchanged with the refrigerant at the chiller.

In the case of a heating mode of the vehicle interior, the refrigerant line connecting the third heat-exchanger and the evaporator may be closed by an operation of the first expansion valve, the refrigerant line connecting the compressor and the second valve may be closed by an operation of the second valve, a portion of refrigerant line connecting the first heat-exchanger and the second heat-exchanger may be closed by an operation of the first valve, the first connection line may be closed by an operation of the second expansion valve, the second connection line may be opened by an operation of the fourth expansion valve, the third connection line may be opened by an operation of the fourth valve, the branch line may be opened by an operation of the third valve, and the fourth connection line may be opened by an operation of the fifth expansion valve.

The third expansion valve and the fourth expansion valve may be configured to expand the refrigerant such that the expanded refrigerant may be supplied to the second heat-exchanger and the third heat-exchanger respectively.

A portion of the refrigerant introduced through the second connection line may flow to the second heat-exchanger through the branch line and remaining refrigerant may flow to the third heat-exchanger.

The refrigerant discharged from the second heat-exchanger and the third heat-exchanger respectively may be supplied to the compressor along the third connection line.

The fifth expansion valve may be configured to supply the refrigerant introduced through the fourth connection line to the evaporator in an unexpanded state.

The second heat-exchanger and the third heat-exchanger may cool or evaporate an interiorly introduced refrigerant according to a selective operation of the third expansion valve and the fourth expansion valve.

The refrigerant may be an R744 refrigerant formed of carbon dioxide.

The first heat-exchanger and the evaporator may be provided inside a HVAC module.

The second heat-exchanger may be connected to an electrical component through a first line through which the coolant circulates, and the chiller may be connected to a battery module through a second line through which the coolant circulates.

The first heat-exchanger and the third heat-exchanger may be an air-cooled gas cooler that heat-exchanges an interiorly introduced refrigerant with air, and the second heat-exchanger may be a water-cooled gas cooler that heat-exchanges an interiorly introduced refrigerant with the coolant.

An accumulator may be provided on the refrigerant line between the evaporator and the compressor.

As described above, by employing a heat pump system for a vehicle according to an embodiment, as cooling or heating of the vehicle interior is performed by using the natural refrigerant, it is possible to cope with environmental regulations and improve the overall marketability of the vehicle.

In addition, according to embodiments of the disclosure, by applying the R744 refrigerant that is a natural refrigerant using carbon dioxide, cooling and heating performance may be maximized by being operated in a super-critical region that is a state in which pressure and temperature of the refrigerant are higher than threshold pressure and temperature for cooling and heating of the vehicle interior.

In addition, according to embodiments of the disclosure, streamlining and simplification of the system may be achieved by efficiently adjusting the temperature of the battery module by using the single chiller that heat-exchanges the coolant and the refrigerant according to the mode of the vehicle.

In addition, according to an embodiment, by efficiently adjusting the temperature of the battery module, the optimal performance of the battery module may be enabled, and the overall travel distance of the vehicle may be increased due to the efficient management of the battery module.

In addition, according to embodiments of the disclosure, in the heating mode of the vehicle interior, as the refrigerant is branched through the branch line and then expanded and supplied to the second and third heat-exchangers, the flow of the refrigerant may be easily controlled, the ambient air heat and the waste heat of the electrical component may be smoothly recollected, and at the same time, the chiller for cooling the battery module may be optimally designed.

In addition, according to an embodiment, it is possible to reduce manufacturing cost and weight through simplification of an entire system and to improve space utilization.

DETAILED DESCRIPTION OF ILLUSTRATIVE EMBODIMENTS

Figure 1:
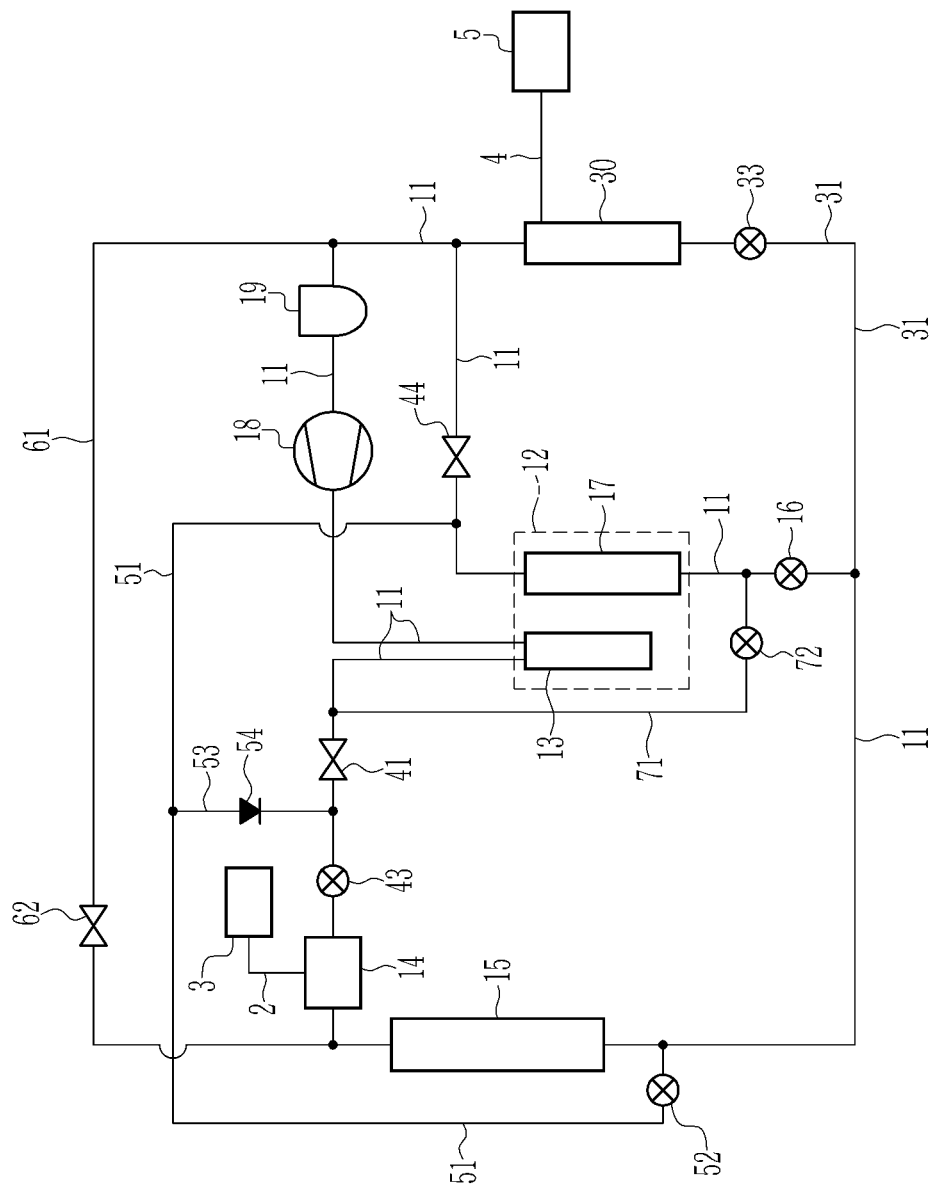
FIG. 1 is a block diagram of a heat pump system of a vehicle according to an embodiment.

Exemplary embodiments of the present invention will hereinafter be described in detail with reference to the accompanying drawings.

Exemplary embodiments disclosed in the present specification and the constructions depicted in the drawings are only the preferred embodiments of the present disclosure and do not cover the entire scope of the embodiments of the present disclosure. Therefore, it will be understood that there may be various equivalents and variations at the time of the application of this specification.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but embodiments of the present disclosure are not necessarily limited thereto, and in the drawings, the thickness of layers, films, panels, regions, etc., are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit", " . . . means", " . . . portions", " . . . part", and " . . . member" described in the specification, mean a unit of a comprehensive element that performs at least one function or operation.

FIG. 1 is a block diagram of a heat pump system of a vehicle according to an embodiment.

In order to cope with environmental regulations, a heat pump system for a vehicle according to an embodiment may perform cooling or heating of the vehicle interior by using a natural refrigerant and may efficiently adjust the temperature of a battery module 5 by using a single chiller 30 that heat-exchanges the refrigerant and a coolant.

Here, the refrigerant may be an R744 refrigerant formed of carbon dioxide, of which ODP (Ozone Depletion Potential) is 0 and GWP (Global Warming Potential) is 1.

That is, by applying the R744 refrigerant that is a natural refrigerant using carbon dioxide, a heat pump system for a vehicle according to an embodiment may maximize cooling and heating performance by being operated in a super-critical cycle that is a state in which the pressure and temperature of the refrigerant are higher than a threshold pressure and temperature.

For such a purpose, a heat pump system according to an embodiment may include an air conditioner unit and the chiller 30.

Referring to FIG. 1, the air conditioner unit includes a first heat-exchanger 13, a second heat-exchanger 14, a third heat-exchanger 15, a first expansion valve 16, an evaporator 17, and a compressor 18 that are interconnected through a refrigerant line 11 to circulate the refrigerant through the refrigerant line 11.

First, the first heat-exchanger 13 may heat-exchange the refrigerant supplied from the compressor 18 with air.

The second heat-exchanger 14 may be connected to the first heat-exchanger 13 through the refrigerant line 11. Accordingly, the refrigerant supplied to the refrigerant line 11 may pass through the second heat-exchanger 14.

Here, the second heat-exchanger 14 may be connected to an electrical component 3 through a first line 2 through which the coolant circulates.

The electrical component 3 may include a power conversion device, such as an electric power control unit (EPCU), a motor, an inverter, or an on-board charger (OBC), and an autonomous driving controller, or the like.

The electrical component 3 may be water-cooled by being connected to the first line 2.

In the present embodiment, the third heat-exchanger 15 may be connected to the second heat-exchanger 14 through the refrigerant line 11. The third heat-exchanger 15 is disposed in a frontal side of the vehicle and may cool or evaporate the refrigerant through heat-exchange with the air introduced from the outside during running of the vehicle.

Here, since the R744 refrigerant is a super-critical refrigerant and, differently from the refrigerant, does not have a phase-change, it is referred to as a gas cooling rather than condensation.

That is, the first heat-exchanger 13 and the third heat-exchanger 15 may be an air-cooled gas cooler that heat-exchanges the interiorly introduced refrigerant with air.

In addition, the second heat-exchanger 14 may cool or evaporate the refrigerant through heat-exchange with the coolant supplied through the first line 2. The second heat-exchanger 14 may be a water-cooled gas cooler that heat-exchanges the interiorly introduced refrigerant with the coolant.

In the present embodiment, the first expansion valve 16 is provided on the refrigerant line 11 between the third heat-exchanger 15 and the evaporator 17. The first expansion valve 16 may selectively expand the refrigerant introduced through the refrigerant line 11.

The evaporator 17 may be provided on the refrigerant line 11 between the first expansion valve 16 and the compressor 18.

Here, the first heat-exchanger 13 and the evaporator 17 may be provided inside a HVAC module (Heating, Ventilation, and Air Conditioning module) 12.

Meanwhile, an opening/closing door (not shown) may be provided inside the HVAC module 12 between the first heat-exchanger 13 and the evaporator 17 such that the air having passed through the evaporator 17 may selectively flow to the first heat-exchanger 13.

The opening/closing door is opened in a heating mode of the vehicle interior such that the air having passed through the evaporator 17 may flow to the first heat-exchanger 13.

To the contrary, in a cooling mode of the vehicle interior, the opening/closing door closes the first heat-exchanger 13 such that the air cooled while passing through the evaporator 17 may be directly drawn to the vehicle interior.

In the present embodiment, an accumulator 19 may be provided on the refrigerant line 11 between the evaporator 17 and the compressor 18.

The accumulator 19 only supplies a gaseous refrigerant to the compressor 18, thereby enhancing efficiency and durability of the compressor 18.

In addition, although not shown in the drawings, an internal heat-exchanger may be provided inside the accumulator 19.

The internal heat-exchanger may heat-exchange the refrigerant cooled at the third heat-exchanger 15 with the low temperature refrigerant discharged from the evaporator 17 and supply the heat-exchanged refrigerant to the compressor 18 and the evaporator 17 respectively.

In the present embodiment, the chiller 30 may be connected to the battery module 5 through a second line 4 through which the coolant circulates. Accordingly, the coolant may be selectively circulated through the chiller 30.

The chiller 30 is connected to the refrigerant line 11 through a first connection line 31. That is, the chiller 30 may be a water-cooled heat-exchanger through which the coolant flows.

Here, a first end of the first connection line 31 is connected to the refrigerant line 11 between the third heat-exchanger 15 and the first expansion valve 16. In addition, a second end of the first connection line 31 may be connected to the refrigerant line 11 between the evaporator 17 and the accumulator 19.

That is, the chiller 30 may adjust the temperature of the coolant by heat-exchanging the coolant selectively introduced through the second line 4 with the refrigerant selectively supplied from the air conditioner unit.

Accordingly, the coolant having heat-exchanged at the chiller 30 may circulate through the battery module 5 through the second line 4.

Meanwhile, a water pump (not shown) may be provided on the first line 2 and the second line 4.

That is, the coolant may circulate through the first line 2 and the second line 4 according to the operation of each water pump (not shown).

Accordingly, the coolant having heat-exchanged with the refrigerant at the second heat-exchanger 14 and the chiller 30 may adjust the temperatures of the electrical component 3 and the battery module 5 while being selectively supplied to the electrical component 3 and the battery module 5.

Meanwhile, in the present embodiment, the air conditioner unit may further include a second expansion valve 33, a first valve 41, a third expansion valve 43, a second valve 44, a second connection line 51, a fourth expansion valve 52, a branch line 53, a third valve 54, a third connection line 61, a fourth valve 62, a fourth connection line 71, and a fifth expansion valve 72.

First, the second expansion valve 33 may be provided on the first connection line 31 upstream of the chiller 30.

The second expansion valve 33 may selectively expand the refrigerant introduced through the first connection line 31 and flow the selectively expanded refrigerant to the chiller 30 according to the cooling mode or the heating mode of the vehicle interior.

In addition, the second expansion valve 33 may supply the refrigerant introduced through the first connection line 31 to the chiller 30 without expansion or may close the first connection line 31 such that the refrigerant is not supplied to the chiller 30.

In more detail, when the battery module 5 is to be cooled by using the coolant having heat-exchanged with the refrigerant at the chiller 30, the second expansion valve 33 may open the first connection line 31. At the same time, the second expansion valve 33 may expand the refrigerant introduced through the first connection line 31 and flow the expanded refrigerant to the chiller 30.

That is, the second expansion valve 33 may further lower the temperature of the coolant passing through the interior of the chiller 30 by expanding the refrigerant discharged from the third heat-exchanger 15 to lower its temperature and by flowing the refrigerant with the lowered temperature to the chiller 30.

Accordingly, the coolant cooled while passing through the chiller 30 may flow through the battery module 5, thereby achieving more efficient cooling.

In the present embodiment, the first valve 41 may be provided on the refrigerant line 11 between the first heat-exchanger 13 and the second heat-exchanger 14.

The third expansion valve 43 may be provided on the refrigerant line 11 between the first valve 41 and the second heat-exchanger 14.

Here, in the case of the cooling mode of the vehicle interior, the third expansion valve 43 may flow the refrigerant supplied from the first heat-exchanger 13 to the second heat-exchanger 14 in an unexpanded state.

To the contrary, in the heating mode of the vehicle interior, the third expansion valve 43 may expand the refrigerant introduced through the refrigerant line 11 and supply the expanded refrigerant to the second heat-exchanger 14.

Accordingly, in the heating mode of the vehicle interior, the second heat-exchanger 14 may evaporate the refrigerant through heat-exchange with the coolant supplied through the first line 2.

That is, the second heat-exchanger 14 may cool or evaporate the interiorly introduced refrigerant through heat-exchange with the coolant supplied through the second line 2 according to a selective operation of the third expansion valve 43.

Here, the first valve 41 may be disposed on the refrigerant line 11 between the first heat-exchanger 13 and the third expansion valve 43.

The second valve 44 may be provided on the refrigerant line 11 between the evaporator 17 and the compressor 18.

In the present embodiment, a first end of the second connection line 51 is connected to the refrigerant line 11 between the evaporator 17 and the second valve 44. A second end of the second connection line 51 may be connected to the refrigerant line 11 between the third heat-exchanger 15 and the first expansion valve 16.

In addition, the fourth expansion valve 52 may be provided on the second connection line 51.

In the heating mode of the vehicle interior, the fourth expansion valve 52 may expand the refrigerant introduced through the second connection line 51 and supply the expanded refrigerant to the third heat-exchanger 15.

That is, the third heat-exchanger 15 may cool or evaporate the interiorly introduced refrigerant according to a selective operation of the fourth expansion valve 52.

In the present embodiment, a first end of the branch line 53 is connected to the refrigerant line 11 between the first valve 41 and the third expansion valve 43. In addition, a second end of the branch line 53 may be connected to the second connection line 51.

The third valve 54 is provided on the branch line 53. The third valve 54 may be operated such that a portion of the refrigerant introduced through the second connection line 51 may flow to the second heat-exchanger 14 through the third expansion valve 43.

In addition, the third valve 54 may prevent the refrigerant flowing along the refrigerant line 11 from flowing backward to the second connection line 51 through the branch line 53.

That is, the branch line 53 may be opened by an operation of the third valve 54 such that a portion of the refrigerant introduced through the second connection line 51 is supplied to the second heat-exchanger 14.

Accordingly, a portion of the refrigerant introduced through the second connection line 51 may flow to the second heat-exchanger 14 through the branch line 53, and remaining refrigerant may flow to the third heat-exchanger 15.

In the present embodiment, a first end of the third connection line 61 is connected to the refrigerant line 11 between the second heat-exchanger 14 and the third heat-exchanger 15. In addition, a second end of the third connection line 61 may be connected to the refrigerant line 11 between the second valve 44 and the compressor 18.

The fourth valve 62 may be provided on the third connection line 61. The fourth valve 62 may selectively open and close the third connection line 61.

In more detail, in the case of the cooling mode of the vehicle interior, the fourth valve 62 may close the third connection line 61. To the contrary, in the case of the heating mode of the vehicle interior, the fourth valve 62 may open the third connection line 61.

That is, the third connection line 61 may selectively flow the refrigerant discharged from the second and third heat-exchangers 14 and 15 directly to the accumulator 19 by an operation of the fourth valve 62.

In the present embodiment, a first end of the fourth connection line 71 is connected to the refrigerant line between the first heat-exchanger 13 and the first valve. In addition, a second end of the fourth connection line 71 may be connected to the refrigerant line 11 between the first expansion valve 16 and the evaporator 17.

In addition, the fifth expansion valve 72 may be provided on the fourth connection line 71. The fifth expansion valve 72 may close the fourth connection line 71 in the cooling mode of the vehicle interior.

On the other hand, the fifth expansion valve 72 may open the fourth connection line 71 in the heating mode of the vehicle interior. At this time, the fifth expansion valve 72 may supply the refrigerant introduced through the fourth connection line 71 to the evaporator 17 in an unexpanded state.

In addition, when dehumidification is required in the heating mode of the vehicle interior, the fifth expansion valve 72 may expand the refrigerant introduced through the fourth connection line 71 and supply the expanded refrigerant to the evaporator 17.

Hereinafter, an operation and action of a heat pump system for a vehicle according to an embodiment configured as described above is described in detail with reference to FIG. 2 and FIG. 3.

First, an operation to cool the battery module 5 in the cooling mode of the vehicle interior is described with reference to FIG. 2.

Figure 2:
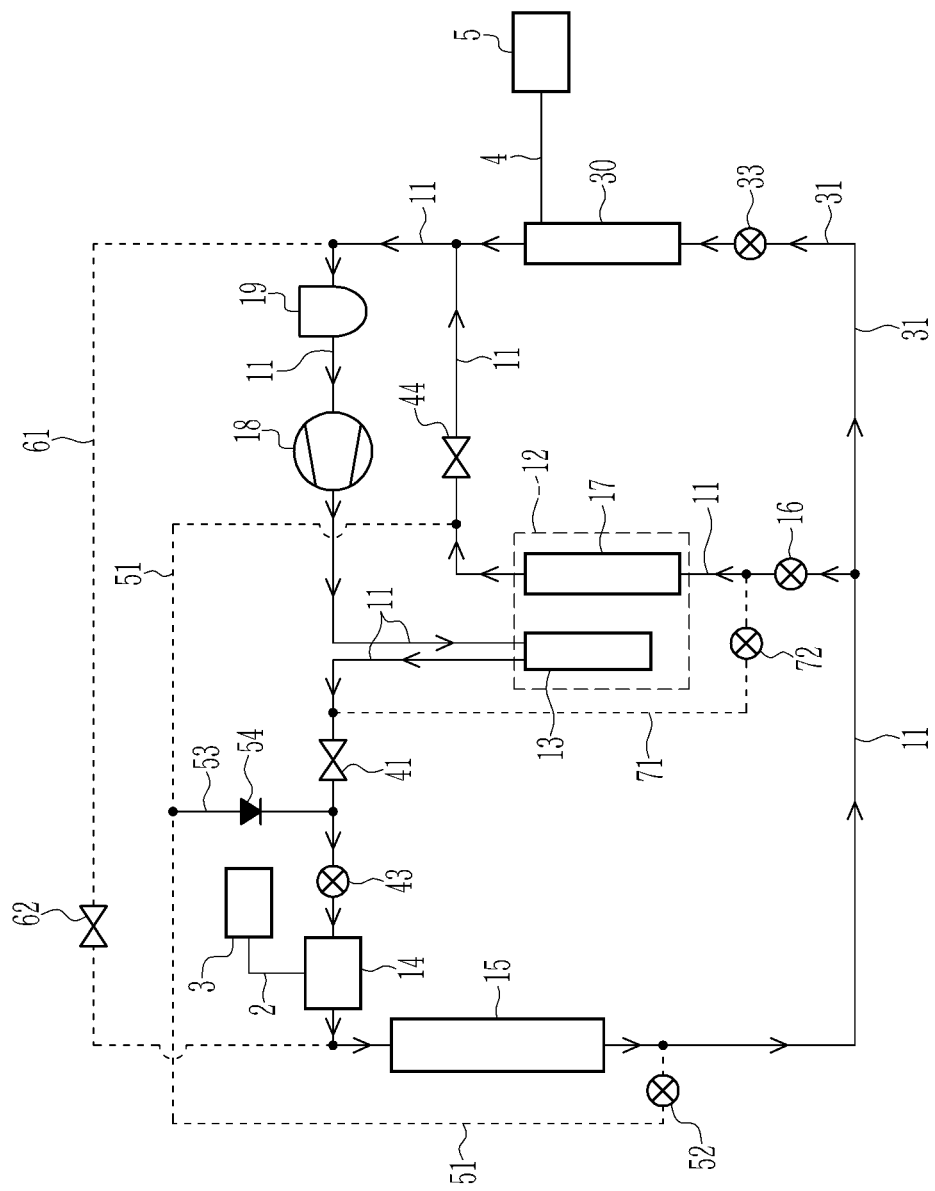
FIG. 2 is an operation diagram of a heat pump system for a vehicle according to an embodiment for cooling a battery module in a cooling mode of the vehicle interior.

FIG. 2 is an operation diagram of a heat pump system for a vehicle according to an embodiment for the cooling mode of the vehicle interior.

Referring to FIG. 2, the coolant may circulate through the first line 2 by an operation of a water pump (not shown).

Accordingly, the coolant having passed through the electrical component 3 may be supplied to the second heat-exchanger 14 along the first line 2.

Respective components in the air conditioner unit constituent element operate for cooling of the vehicle interior. Accordingly, the refrigerant circulates along the refrigerant line 11.

The refrigerant line 11 connecting the evaporator 17 and the compressor 18 is opened by an operation of the second valve 44.

The refrigerant line 11 connecting the first heat-exchanger 13 and the second heat-exchanger 14 is opened by the operation of the first valve 41 and the third expansion valve 43.

Here, the third expansion valve 43 may supply the refrigerant supplied from the first heat-exchanger 13 to the second heat-exchanger 14 in an unexpanded state.

Simultaneously, the second connection line 51 is closed by the operation of the fourth expansion valve 52. The third connection line 61 is closed by the operation of the fourth valve 62.

In addition, the branch line 53 is closed by the operation of the third valve 54. In addition, the fourth connection line 71 is closed by an operation of the fifth expansion valve 72.

In addition, the first connection line 31 is opened for cooling of the battery module 5 by an operation of the second expansion valve 33.

At this time, the coolant may circulate through the second line 4 by an operation of a water pump (not shown). Accordingly, the coolant having passed through the battery module 5 may be supplied to the chiller 30 along the second line 4.

Here, the second expansion valve 33 may expand the refrigerant introduced through the first connection line 31 and flow the expanded refrigerant to the chiller 30 to cool the battery module 5 by using the coolant having heat-exchanged with the refrigerant at the chiller 30.

Therefore, the coolant having passed through the chiller 30 may be cooled through heat-exchange with the expanded refrigerant supplied to the chiller 30.

That is, the coolant passing through the chiller 30 is cooled through heat-exchange with the expanded refrigerant supplied to the chiller 30. The coolant cooled at the chiller 30 is supplied to the battery module 5 along the second line 4. Accordingly, the battery module 5 may be efficiently cooled by the coolant cooled at the chiller 30.

Meanwhile, the refrigerant supplied from the compressor 18 may sequentially pass through the first heat-exchanger 13, the second heat-exchanger 14, and the third heat-exchanger 15 along the refrigerant line 11.

Here, the first heat-exchanger 13 primarily cools the refrigerant by heat-exchanging the air introduced into the HVAC module 12 with the refrigerant. The refrigerant primarily cooled at the first heat-exchanger 13 is supplied to the second heat-exchanger 14 along the refrigerant line 11.

The second heat-exchanger 14 may secondarily cool the refrigerant by using the coolant flowing along the first line 2.

In addition, the third heat-exchanger 15 may further cool the refrigerant, for the third time, through heat-exchanging the refrigerant from the second heat-exchanger 14 with the air.

The refrigerant having sequentially passed through the first, second, and third heat-exchangers 13, 14, and 15 may circulate along the refrigerant line 11 and the opened first connection line 31.

Here, the first expansion valve 16 and the second expansion valve 33 may expand the refrigerant such that the expanded refrigerant may be supplied to the evaporator 17 and the chiller 30 respectively.

That is, the second expansion valve 33 expands the refrigerant introduced through the first connection line 31, from among the refrigerant having passed through the third heat-exchanger 15, such that the expanded refrigerant is supplied to the chiller 30.

Therefore, the refrigerant introduced through the first connection line 31 is expanded by the operation of the second expansion valve 33 to become in a state of low temperature and low pressure and flows to the chiller 30 provided on the first connection line 31.

Then, the refrigerant introduced into the chiller 30 heat-exchanges with the coolant supplied through the second line 4, passes through the accumulator 19 through the refrigerant line 11 connected to the first connection line 31, and then flows to the compressor 18.

Meanwhile, remaining refrigerant discharged from the third heat-exchanger 15 flows through the refrigerant line 11 to cool the vehicle interior and sequentially passes through the first expansion valve 16, the evaporator 17, the accumulator 19, and the compressor 18.

Here, air drawn into the HVAC module 12 is cooled by the low temperature state refrigerant introduced into the evaporator 17 while passing through the evaporator 17.

At this time, the opening/closing door (not shown) closes a portion passing through the first heat-exchanger 13, such that the cooled air may not pass through the first heat-exchanger 13. Therefore, the cooled air may cool the vehicle interior by being directly drawn to the vehicle interior.

Meanwhile, the refrigerant having a cooled level increased while sequentially passing through the first, second, and third heat-exchangers 13, 14, and 15 is expanded and supplied to the evaporator 17, and therefore, the refrigerant may be evaporated at a lower temperature.

That is, in the present exemplary embodiment, as the first heat-exchanger 13 and the third heat-exchanger 15 cool the refrigerant through heat-exchange with the air, and the second heat-exchanger 14 cools the refrigerant through heat-exchange with the coolant, the R744 refrigerant formed of carbon dioxide may be more efficiently cooled, thereby providing an advantage to formation of sub-cooling of the refrigerant.

In addition, as the refrigerant formed with sub-cooling is evaporated at a lower temperature at the evaporator 17, the temperature of the air passing through the evaporator 17 may be further decreased, thereby improving the cooling performance and efficiency.

While repeatedly performing the above-described processes, the refrigerant may cool the vehicle interior in the cooling mode of the vehicle interior and, at the same time, cool the coolant through heat-exchange while passing through the chiller 30.

The low temperature coolant cooled at the chiller 30 flows to the battery module 5 through the second line 4. Accordingly, the battery module 5 may be efficiently cooled by the supplied low temperature coolant.

In the present embodiment, the operation in the heating mode of the vehicle interior is described with reference to FIG. 3.

Figure 3:
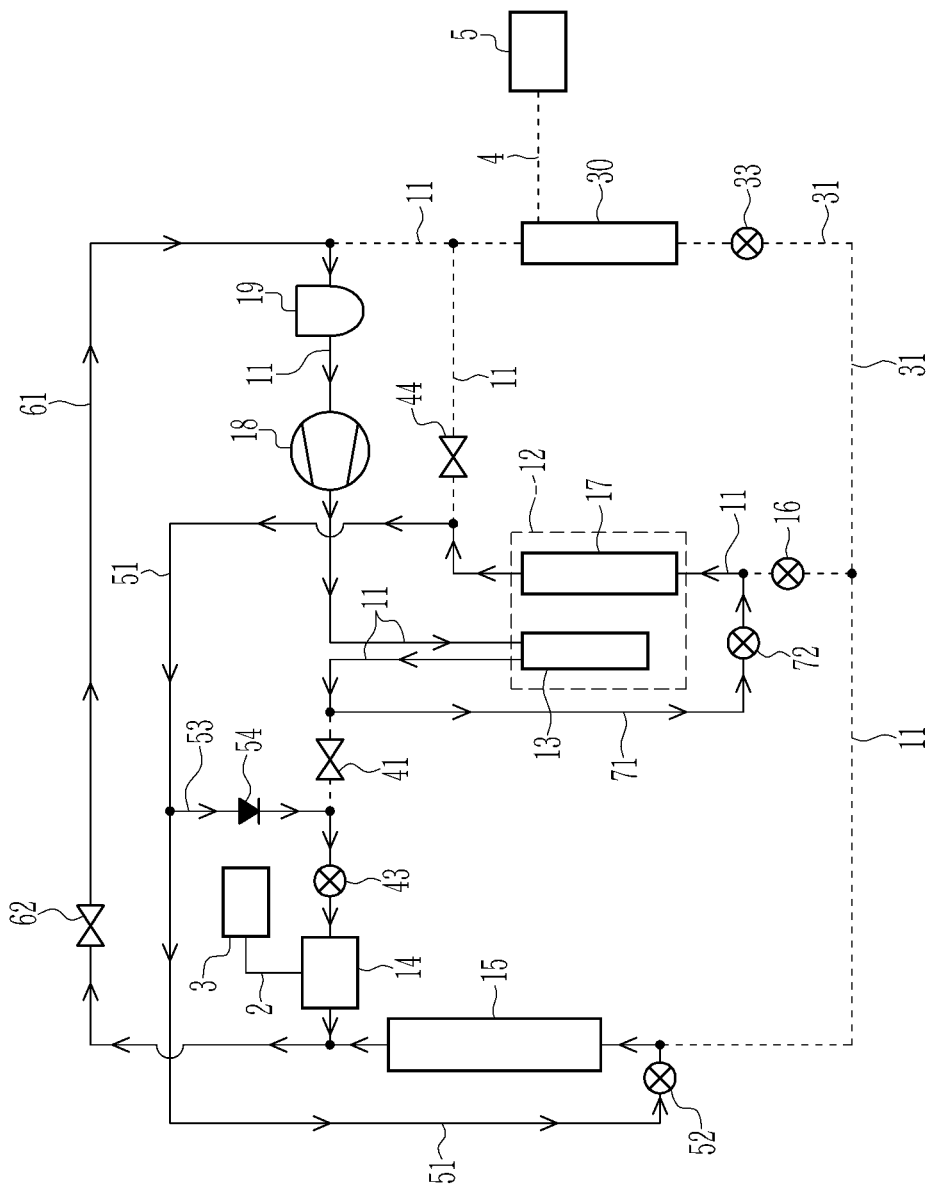
FIG. 3 is an operation diagram of a heat pump system for a vehicle according to an embodiment according to a heating mode of the vehicle interior.

FIG. 3 is an operation diagram of a heat pump system for a vehicle according to an embodiment according to a heating mode of the vehicle interior.

Referring to FIG. 3, the coolant may circulate through the first line 2 by an operation of a water pump (not shown).

Accordingly, the coolant having passed through the electrical component 3 may be supplied to the second heat-exchanger 14 along the first line 2.

Respective components in the air conditioner unit constituent element operate for heating of the vehicle interior. Accordingly, the refrigerant circulates along the refrigerant line 11.

The refrigerant line 11 connecting the third heat-exchanger 15 and the evaporator 17 is closed by an operation of the first expansion valve 16.

The refrigerant line 11 connecting the compressor 18 and the second valve 44 may be closed by the operation of the second valve 44.

A portion of the refrigerant line 11 connecting the first heat-exchanger 13 and the second heat-exchanger 14 is closed by an operation of the first valve 41.

Simultaneously, the first connection line 31 may be closed by the operation of the second expansion valve 33.

In addition, the second connection line 51 is opened by the operation of the fourth expansion valve 52. The branch line 53 may be opened by the operation of the third valve 54.

Simultaneously, a portion of the refrigerant line 11 connecting the branch line 53 and the second heat-exchanger 14 may be opened by the operation of the third expansion valve 43.

Then, a portion of the refrigerant introduced through the second connection line 51 flows to the second heat-exchanger 14 through the opened branch line 53.

In addition, remaining refrigerant of the refrigerant introduced through the second connection line 51 may flow to the third heat-exchanger 15 through the second connection line 51 and the opened refrigerant line 11.

Here, the third expansion valve 43 and the fourth expansion valve 52 may expand the refrigerant such that the expanded refrigerant is supplied to the second heat-exchanger 14 and the third heat-exchanger 15 respectively.

Accordingly, the second heat-exchanger 14 may evaporate the expanded refrigerant through heat-exchange with the coolant supplied through the first line 2. At this time, the second heat-exchanger 14 may recollect waste heat of the electrical component 3 from the heated coolant by recollecting waste heat from the electrical component 3.

In addition, the third heat-exchanger 15 may recollect an ambient air heat while evaporating the expanded refrigerant through heat-exchange with the air.

In the present embodiment, the third connection line 61 is opened by the operation of the fourth valve 62.

Accordingly, the refrigerant discharged from the second heat-exchanger 14 and the third heat-exchanger 15 respectively may be supplied to the compressor 18 along the opened third connection line 61.

In addition, the fourth connection line 71 may be opened by the operation of the fifth expansion valve 72.

Here, the fifth expansion valve 72 may supply the refrigerant introduced through the fourth connection line 71 to the evaporator 17 in an unexpanded state.

In such a state, the refrigerant supplied from the compressor 18 flows to the first heat-exchanger 13 along the refrigerant line 11. The refrigerant having passed through the first heat-exchanger 13 flows to the evaporator 17 along the opened fourth connection line 71.

Here, the first heat-exchanger 13 and the evaporator 17 may cool the refrigerant by heat-exchanging the air introduced into the HVAC module 12 with the refrigerant. The refrigerant primarily cooled at the first heat-exchanger 13 may be further cooled at the evaporator 17.

That is, when the refrigerant having passed through the first heat-exchanger 13 is supplied to the evaporator 17 in an unexpanded state by the operation of the fifth expansion valve 72, the evaporator 17 may cool the refrigerant by heat-exchanging the air introduced into the HVAC module 12 with the refrigerant.

The refrigerant having passed through the evaporator 17 flows along the opened second connection line 51. A portion of the refrigerant introduced through the second connection line 51 flows to the third expansion valve 43 through the opened branch line 53.

In addition, remaining refrigerant of the refrigerant introduced through the second connection line 51 may flow to the fourth expansion valve 52 along the second connection line 51.

Here, the third expansion valve 43 and the fourth expansion valve 52 may expand the refrigerant and supply the expanded refrigerant to the second heat-exchanger 14 and the third heat-exchanger 15 respectively.

That is, the refrigerant introduced through the second connection line 51 is branched by the branch line 53 to be supplied to the second heat-exchanger 14 and the third heat-exchanger 15.

Accordingly, the second heat-exchanger 14 may cool the supplied refrigerant through heat-exchange with the coolant, and at the same time, the third heat-exchanger 15 may cool the supplied refrigerant through heat-exchange with the air. While repeatedly performing such an operation, the second heat-exchanger 14 and the third heat-exchanger 15 may recollect the waste heat of the electrical component 3 and the ambient air heat.

That is, as the recollected waste heat of the electrical component 3 and the recollected ambient air heat are used to increase the temperature of the refrigerant, the heat pump system may reduce the power consumption of the compressor 18 and improve the heating efficiency.

Meanwhile, the refrigerant discharged from each of the second and third heat-exchangers 14 and 15 is supplied to the accumulator 19 along the opened third connection line 61.

The refrigerant having passed through the accumulator 19 may be supplied to the compressor 18.

In addition, the refrigerant compressed to a high-temperature and high-pressure state by the compressor 18 flows into the first heat-exchanger 13.

Here, as described above, the refrigerant supplied to the first heat-exchanger 13 and the evaporator 17 may increase the temperature of the air drawn into the HVAC module 12.

At this time, the opening/closing door (not shown) is opened such that the air drawn into the HVAC module 12 and having passed through the evaporator 17 may pass through the first heat-exchanger 13.

Accordingly, the air introduced from the outside may be converted to a high temperature state while sequentially passing through the evaporator 17 and the first heat-exchanger 13 and flow into the vehicle interior, thereby achieving the heating of the vehicle interior.

Meanwhile, when dehumidification is required while the heating mode of the vehicle interior is under operation, the fifth expansion valve 72 may expand the refrigerant introduced through the fourth connection line 71 and supply the expanded refrigerant to the evaporator 17.

Then, air drawn into the HVAC module 12 is dehumidified by the low temperature state refrigerant introduced into the evaporator 17 while passing through the evaporator 17. Thereafter, as the air may be converted to a high temperature state while passing through the first heat-exchanger 13 and flow into the vehicle interior, the vehicle interior may be smoothly heated and dehumidified.

Therefore, as described above, by employing a heat pump system for a vehicle according to an embodiment, as cooling or heating of the vehicle interior is performed by using the natural refrigerant, it is possible to cope with environmental regulations and improve the overall marketability of the vehicle.

In addition, according to embodiments of the disclosure, by applying the R744 refrigerant that is a natural refrigerant using carbon dioxide, cooling and heating performance may be maximized by being operated in a super-critical region that is a state in which the pressure and temperature of the refrigerant are higher than a threshold pressure and temperature for cooling and heating of the vehicle interior.

In addition, according to embodiments of the disclosure, streamlining and simplification of the system may be achieved by efficiently adjusting the temperature of the battery module 5 by using the single chiller 30 that heat-exchanges the coolant and the refrigerant according to the mode of the vehicle.

In addition, according to an embodiment, by efficiently adjusting the temperature of the battery module 5, the optimal performance of the battery module 5 may be enabled, and the overall travel distance of the vehicle may be increased due to the efficient management of the battery module 5.

In addition, according to embodiments of the disclosure, in the heating mode of the vehicle interior, as the refrigerant is branched through the branch line 53 and then expanded and supplied to the second and third heat-exchangers 14 and 15, the flow of the refrigerant may be easily controlled, the ambient air heat and the waste heat of the electrical component 3 may be smoothly recollected, and at the same time, the chiller 30 for cooling the battery module 5 may be optimally designed.

In addition, according to an embodiment, it is possible to reduce manufacturing cost and weight through simplification of an entire system and to improve space utilization.

While embodiments of this invention have been described in connection with what is presently considered to be practical exemplary embodiments, it is to be understood that the embodiments of the invention are not limited to the disclosed embodiments. On the contrary, they are intended to cover various modifications and equivalent arrangements included within the spirit and scope of the appended claims.

The following reference identifiers may be used in connection with the drawings to describe various features of embodiments of the present invention.

2, 4: first and second lines
3: electrical component
5: battery module
11: refrigerant line
12: HVAC module
13, 14, 15: first, second, and third heat-exchangers
16: first expansion valve
17: evaporator
18: compressor
19: accumulator
30: chiller
31: first connection line
33: second expansion valve
41: first valve
43: third expansion valve
44: second valve
51: second connection line
52: fourth expansion valve
53: branch line
54: third valve
61: third connection line
62: fourth valve
71: fourth connection line
72: fifth expansion valve

What is claimed is:

1. A heat pump system for a vehicle, the system comprising:
an air conditioner unit, configured to circulate a refrigerant through a refrigerant line; and
a chiller connected to the refrigerant line through a first connection line, the chiller being configured to adjust a temperature of a coolant by heat-exchanging the refrigerant supplied from the air conditioner unit with the coolant; and
wherein the air conditioner unit comprises:
a compressor;
a first heat-exchanger;
a second heat-exchanger;
a third heat-exchanger;
a first expansion valve;
an evaporator, wherein the compressor, the first heat-exchanger, the second heat-exchanger, the third heat-exchanger, the first expansion valve, and the evaporator are interconnected by the refrigerant line;
a second expansion valve on the first connection line upstream of the chiller;
a first valve on the refrigerant line between the first heat-exchanger and the second heat-exchanger;
a third expansion valve on the refrigerant line between the first valve and the second heat-exchanger;
a second valve on the refrigerant line between the evaporator and the compressor;
a second connection line having a first end connected to the refrigerant line between the evaporator and the second valve and a second end connected to the refrigerant line between the third heat-exchanger and the first expansion valve; and
a fourth expansion valve on the second connection line.

2. The system of claim 1, wherein the air conditioner unit further comprises:
a branch line having a first end connected to the refrigerant line between the first valve and the third expansion valve and a second end connected to the second connection line;
a third valve on the branch line;
a third connection line having a first end connected to the refrigerant line between the second heat-exchanger and the third heat-exchanger and a second end connected to the refrigerant line between the second valve and the compressor;
a fourth valve on the third connection line;
a fourth connection line having a first end connected to the refrigerant line between the first heat-exchanger and the first valve and a second end connected to the refrigerant line between the first expansion valve and the evaporator; and
a fifth expansion valve on the fourth connection line.

3. The system of claim 2, wherein, in a cooling mode of an interior of the vehicle:
the second valve is configured to open the refrigerant line connecting the evaporator and the compressor;
the first valve and the third expansion valve are configured to open the refrigerant line connecting the first heat-exchanger and the second heat-exchanger;
the fourth expansion valve is configured to close the second connection line;
the fourth valve is configured to close the third connection line;
the third valve is configured to close the branch line; and
the fifth expansion valve is configured to close the fourth connection line.

4. The system of claim 3, wherein the third expansion valve is configured to supply the refrigerant supplied from the first heat-exchanger to the second heat-exchanger in an unexpanded state.

5. The system of claim 3, wherein, in a state in which cooling of a battery module is required in the cooling mode of the interior of the vehicle, the second expansion valve is configured to open the first connection line.

6. The system of claim 5, wherein the second expansion valve is configured to expand the refrigerant introduced through the first connection line and flow the expanded refrigerant to the chiller to cool the battery module by using the coolant having heat-exchanged with the refrigerant at the chiller.

7. The system of claim 2, wherein, in a heating mode of an interior of the vehicle:
the first expansion valve is configured to close the refrigerant line connecting the third heat-exchanger and the evaporator;
the second valve is configured to close the refrigerant line connecting the compressor and the second valve;
the first valve is configured to close a portion of the refrigerant line connecting the first heat-exchanger and the second heat-exchanger;
the second expansion valve is configured to close the first connection line;
the fourth expansion valve is configured to open the second connection line;
the fourth valve is configured to open the third connection line;
the third valve is configured to open the branch line; and
the fifth expansion valve is configured to open the fourth connection line.

8. The system of claim 7, wherein the third expansion valve and the fourth expansion valve are configured to expand the refrigerant such that the expanded refrigerant is supplied to the second heat-exchanger and the third heat-exchanger, respectively.

9. The system of claim 7, wherein:
a first portion of the refrigerant introduced through the second connection line is configured to flow to the second heat-exchanger through the branch line; and
a remaining portion of the refrigerant is configured to flow to the third heat-exchanger.

10. The system of claim 7, wherein the refrigerant discharged from the second heat-exchanger and the third heat-exchanger, respectively, is configured to be supplied to the compressor along the third connection line.

11. The system of claim 7, wherein the fifth expansion valve is configured to supply the refrigerant introduced through the fourth connection line to the evaporator in an unexpanded state.

12. The system of claim 2, wherein the second heat-exchanger and the third heat-exchanger are configured to cool or evaporate an interiorly introduced refrigerant according to a selective operation of the third expansion valve and the fourth expansion valve.

13. The system of claim 1, wherein the refrigerant comprises an R744 refrigerant comprising carbon dioxide.

14. The system of claim 1, wherein the first heat-exchanger and the evaporator are provided inside a HVAC module.

15. The system of claim 1, wherein:
the second heat-exchanger is connected to an electrical component through a first line configured to circulate the coolant therethrough; and
the chiller is connected to a battery module through a second line configured to circulate the coolant therethrough.

16. The system of claim 1, wherein:
the first heat-exchanger and the third heat-exchanger each comprise an air-cooled gas cooler configured to heat-exchange an interiorly introduced refrigerant with air; and
the second heat-exchanger comprises a water-cooled gas cooler configured to heat-exchange the interiorly introduced refrigerant with the coolant.

17. The system of claim 1, further comprising an accumulator on the refrigerant line between the evaporator and the compressor.

18. A method of providing a heat pump system for a vehicle, the method comprising:
providing an air conditioner unit, the air conditioner unit comprising:
a compressor, a first heat-exchanger, a second heat-exchanger, a third heat-exchanger, a first expansion valve, and an evaporator that are interconnected by a refrigerant line, wherein the air conditioner unit circulates a refrigerant through the refrigerant line;
a second expansion valve on a first connection line;
a first valve on the refrigerant line between the first heat-exchanger and the second heat-exchanger;
a third expansion valve on the refrigerant line between the first valve and the second heat-exchanger;
a second valve on the refrigerant line between the evaporator and the compressor;

a second connection line having a first end connected to the refrigerant line between the evaporator and the second valve and a second end connected to the refrigerant line between the third heat-exchanger and the first expansion valve;

a fourth expansion valve on the second connection line;

a branch line having a first end connected to the refrigerant line between the first valve and the third expansion valve and a second end connected to the second connection line;

a third valve on the branch line;

a third connection line having a first end connected to the refrigerant line between the second heat-exchanger and the third heat-exchanger and a second end connected to the refrigerant line between the second valve and the compressor;

a fourth valve on the third connection line;

a fourth connection line having a first end connected to the refrigerant line between the first heat-exchanger and the first valve and a second end connected to the refrigerant line between the first expansion valve and the evaporator; and a fifth expansion valve on the fourth connection line; and connecting a chiller to the refrigerant line through the first connection line, wherein the second expansion valve is upstream of the chiller, and wherein the chiller adjusts a temperature of a coolant by heat-exchanging the refrigerant supplied from the air conditioner unit with the coolant.

19. The method of claim 18, wherein the refrigerant comprises an R744 refrigerant comprising carbon dioxide.

20. The method of claim 18, further comprising providing an accumulator on the refrigerant line between the evaporator and the compressor.

* * * * *